US012406606B2

(12) United States Patent
Park et al.

(10) Patent No.: US 12,406,606 B2
(45) Date of Patent: Sep. 2, 2025

(54) DISPLAY APPARATUS

(71) Applicant: Samsung Display Co., Ltd., Yongin-Si (KR)

(72) Inventors: Junhyun Park, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 10 days.

(21) Appl. No.: 18/588,020

(22) Filed: Feb. 27, 2024

(65) Prior Publication Data

US 2024/0428715 A1 Dec. 26, 2024

(30) Foreign Application Priority Data

Jun. 21, 2023 (KR) ........................ 10-2023-0079918

(51) Int. Cl.
*G09G 3/20* (2006.01)

(52) U.S. Cl.
CPC ....... *G09G 3/20* (2013.01); *G09G 2300/0819* (2013.01); *G09G 2300/0852* (2013.01); *G09G 2300/0861* (2013.01); *G09G 2310/08* (2013.01); *G09G 2320/045* (2013.01); *G09G 2330/021* (2013.01)

(58) Field of Classification Search
CPC ............. G09G 3/20; G09G 2300/0819; G09G 2300/0852; G09G 2300/0861; G09G 2310/08; G09G 2320/045; G09G 2330/021
See application file for complete search history.

(56) References Cited

U.S. PATENT DOCUMENTS

| | | | | |
|---|---|---|---|---|
| 11,056,049 | B2 | 7/2021 | Kim et al. | |
| 11,450,271 | B2 | 9/2022 | Na | |
| 2021/0319755 | A1* | 10/2021 | Kim | G09G 3/3233 |
| 2022/0358881 | A1 | 11/2022 | Chae et al. | |

FOREIGN PATENT DOCUMENTS

| | | | |
|---|---|---|---|
| KR | 10-2021-0013509 | A | 2/2021 |
| KR | 10-2021-0049221 | A | 5/2021 |
| KR | 10-2022-0151088 | A | 11/2022 |

* cited by examiner

*Primary Examiner* — Afroza Chowdhury
(74) *Attorney, Agent, or Firm* — Innovation Counsel LLP

(57) ABSTRACT

A display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel is configured to emit light based on a data writing gate signal, a data initialization gate signal, a compensation gate signal, the emission signal and the data voltage. When the data writing gate signal is driven in a maximum frequency in a variable frequency driving, a frequency of at least one of the data initialization gate signal and the compensation gate signal is less than a frequency of the data writing gate signal.

20 Claims, 12 Drawing Sheets

DISPLAY APPARATUS

PRIORITY STATEMENT

This application claims priority under 35 U.S.C. § 119 to Korean Patent Application No. 10-2023-0079918, filed on Jun. 21, 2023, in the Korean Intellectual Property Office KIPO, the contents of which are herein incorporated by reference in their entireties.

BACKGROUND

1. Field

Embodiments of the present inventive concept relate to a display apparatus. More particularly, embodiments of the present inventive concept relate to a display apparatus reducing a power consumption by determining a frequency of at least one of a data initialization gate signal and a compensation gate signal to be less than a frequency of a data writing gate signal.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the plurality of gate lines. The data driver outputs data voltages to the plurality of data lines. The emission driver outputs emission signals to the plurality of emission lines. The driving controller controls the gate driver, the data driver and the emission driver.

In a display apparatus supporting a variable frequency, data may be written to the pixel in a maximum frequency so that a frequency of a data writing gate signal, a frequency of a data initialization gate signal and a frequency of a compensation gate signal may be the same as each other. When the frequency of a data writing gate signal, the frequency of a data initialization gate signal and the frequency of a compensation gate signal may be the same as each other, a power consumption of the display apparatus may be great.

SUMMARY

Embodiments of the present inventive concept provide a display apparatus capable of reducing a power consumption in the display apparatus supporting a variable frequency.

In an embodiment of a display apparatus according to the present inventive concept, the display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel is configured to emit light based on a data writing gate signal, a data initialization gate signal, a compensation gate signal, the emission signal and the data voltage. When the data writing gate signal is driven in a maximum frequency in a variable frequency driving, a frequency of at least one of the data initialization gate signal and the compensation gate signal is less than a frequency of the data writing gate signal.

In an embodiment, when the frequency of the data writing gate signal is reduced in the variable frequency driving, the frequency of at least one of the data initialization gate signal and the compensation gate signal may be reduced.

In an embodiment, a frequency of the emission signal may be greater than the frequency of the data writing gate signal.

In an embodiment, a frequency of the data initialization gate signal may be less than the frequency of the data writing gate signal. A frequency of the compensation gate signal may be less than the frequency of the data writing gate signal.

In an embodiment, a frequency of the compensation gate signal may be less than the frequency of the data writing gate signal.

In an embodiment, a frequency of the data initialization gate signal may be substantially the same as the frequency of the data writing gate signal.

In an embodiment, a frequency of the emission signal may be greater than the frequency of the data writing gate signal. A frequency of the data initialization gate signal may be substantially the same as the frequency of the emission signal.

In an embodiment, a frequency of the data initialization gate signal may be less than the frequency of the data writing gate signal. A frequency of the compensation gate signal may be substantially the same as the frequency of the data writing gate signal.

In an embodiment, the pixel may include a light emitting element, a first transistor configured to apply a driving current to the light emitting element and a second transistor configured to write the data voltage to a storage capacitor. The data writing gate signal may be applied to a control electrode of the second transistor.

In an embodiment, the pixel may further include a third transistor connected between a control electrode of the first transistor and a second electrode of the first transistor. The compensation gate signal may be applied to a control electrode of the third transistor.

In an embodiment, the pixel may further include a fifth transistor configured to apply a reference voltage to a second electrode of the second transistor. The compensation gate signal may be applied to a control electrode of the fifth transistor.

In an embodiment, the pixel may further include a fourth transistor configured to apply an initialization voltage to a control electrode of the first transistor. The data initialization gate signal may be applied to a control electrode of the fourth transistor.

In an embodiment, the pixel may include a first transistor including a control electrode connected to a first node, a first electrode connected to a second node and a second electrode connected to a third node, a second transistor including a control electrode configured to receive the data writing gate signal, a first electrode configured to receive the data voltage and a second electrode connected to a fourth node, a third transistor including a control electrode configured to receive the compensation gate signal, a first electrode connected to the first node and a second electrode connected to the third node, a fourth transistor including a control electrode configured to receive the data initialization gate signal, a first electrode configured to receive an initialization voltage and a second electrode connected to the first node, a fifth transistor including a control electrode configured to receive the compensation gate signal, a first electrode configured to receive a reference voltage and a second electrode connected to the fourth node, a sixth transistor including a control electrode configured to receive a second emission signal, a first electrode connected to the third node and a second electrode connected to an anode electrode of a light emitting element, a seventh transistor including a control electrode configured to receive a light emitting element initialization gate signal, a first electrode configured to receive the initialization voltage and a second electrode connected to the anode electrode of the light emitting element, an eighth transistor including a control electrode configured to receive the light emitting element initialization gate signal, a first electrode configured to receive a bias voltage and a second electrode connected to the second node, a ninth transistor including a control electrode configured to receive a first emission signal, a first electrode configured to receive a high power voltage and a second electrode connected to the second node, a hold capacitor including a first electrode configured to receive the high power voltage and a second electrode connected to the fourth node, a storage capacitor including a first electrode connected to the fourth node and a second electrode connected to the first node and the light emitting element including the anode electrode and a cathode electrode configured to receive a low power voltage.

In an embodiment, the data initialization gate signal may have an active pulse in a data initialization period. The compensation gate signal may have an inactive pulse in the data initialization period. The data writing gate signal may have an inactive level in the data initialization period. The data initialization gate signal may have an inactive level in a compensation period. The compensation gate signal may have an active pulse in the compensation period. The data writing gate signal may have the inactive level in the compensation period. The data initialization gate signal may have the inactive level in a data writing period. The compensation gate signal may have the inactive level in the data writing period. The data writing gate signal may have an active pulse in the data writing period.

In an embodiment, the data initialization period and the compensation period may be repeated multiple times prior to the data writing period.

In an embodiment, the pixel may include a first transistor including a control electrode connected to a first node, a first electrode connected to a second node and a second electrode connected to a third node, a second transistor including a control electrode configured to receive the data writing gate signal, a first electrode configured to receive the data voltage and a second electrode connected to a fourth node, a third transistor including a control electrode configured to receive the compensation gate signal, a first electrode connected to the first node and a second electrode connected to the third node, a fourth transistor including a control electrode configured to receive the data initialization gate signal, a first electrode configured to receive a first initialization voltage and a second electrode connected to the first node, a fifth transistor including a control electrode configured to receive the compensation gate signal, a first electrode configured to receive a reference voltage and a second electrode connected to the fourth node, a sixth transistor including a control electrode configured to receive a second emission signal, a first electrode connected to the third node and a second electrode connected to an anode electrode of a light emitting element, a seventh transistor including a control electrode configured to receive a light emitting element initialization gate signal, a first electrode configured to receive a second initialization voltage and a second electrode connected to the anode electrode of the light emitting element, an eighth transistor including a control electrode configured to receive the light emitting element initialization gate signal, a first electrode configured to receive a bias voltage and a second electrode connected to the second node, a ninth transistor including a control electrode configured to receive a first emission signal, a first electrode configured to receive a high power voltage and a second electrode connected to the second node, a hold capacitor including a first electrode configured to receive the high power voltage and a second electrode connected to the fourth node, a storage capacitor including a first electrode connected to the fourth node and a second electrode connected to the first node and the light emitting element including the anode electrode and a cathode electrode configured to receive a low power voltage.

In an embodiment of a display apparatus according to the present inventive concept, the display apparatus includes a display panel, a gate driver, a data driver and an emission driver. The display panel includes a pixel. The gate driver is configured to provide a gate signal to the pixel. The data driver is configured to provide a data voltage to the pixel. The emission driver is configured to provide an emission signal to the pixel. The pixel is configured to emit light based on a data writing gate signal, a data initialization gate signal, a compensation gate signal, the emission signal and the data voltage. The data initialization gate signal has an active pulse in a first period. The compensation gate signal has an active pulse in the first period. The data writing gate signal has an active pulse in the first period. The emission signal has an active period in the first period. The data initialization gate signal does not have the active pulse in a second period subsequent to the first period. The compensation gate signal does not have the active pulse in the second period. The data writing gate signal does not have the active pulse in the second period. The emission signal has the active period in the second period. At least one of the data initialization gate signal and the compensation gate signal does not have the active pulse in a third period subsequent to the second period. The data writing gate signal has the active pulse in the third period. The emission signal has the active period in the third period.

In an embodiment, the data initialization gate signal may not have the active pulse in the third period. The compensation gate signal may not have the active pulse in the third period.

In an embodiment, the data initialization gate signal may have the active pulse in the third period. The compensation gate signal may not have the active pulse in the third period.

In an embodiment, the data initialization gate signal may not have the active pulse in the third period. The compensation gate signal may have the active pulse in the third period.

According to the display apparatus, in the display apparatus supporting the variable frequency, the frequency of at least one of the data initialization gate signal and the compensation gate signal may be set to be different from the frequency of the data writing gate signal so that the power consumption of the display apparatus may be reduced. For example, in the display apparatus supporting the variable frequency, the frequency of at least one of the data initialization gate signal and the compensation gate signal may be set to be less than the frequency of the data writing gate signal so that the power consumption of the display apparatus may be reduced.

BRIEF DESCRIPTION OF THE DRAWINGS

The above and other features and advantages of the inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
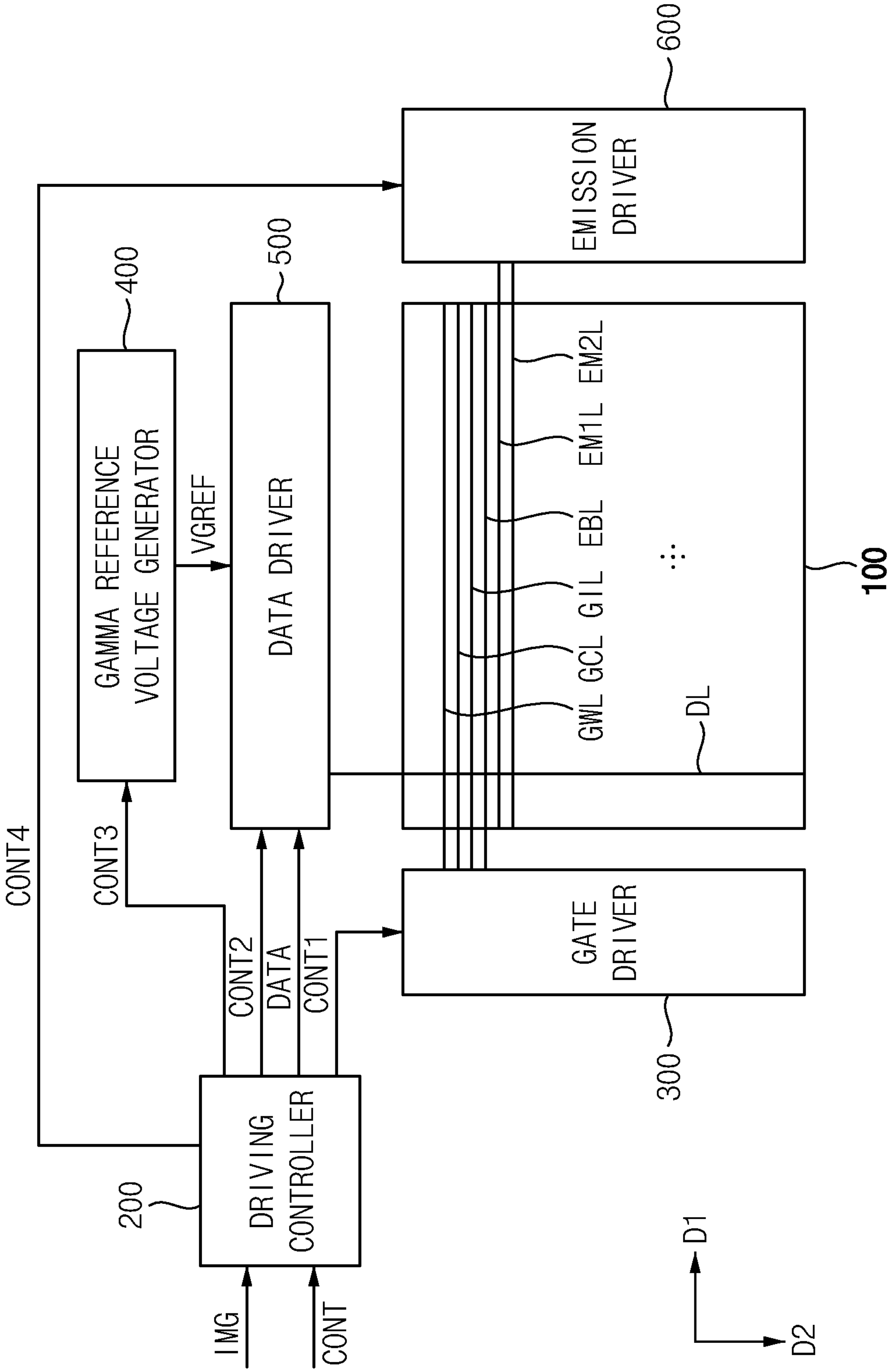
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 has a display region on which an image is displayed and a peripheral region disposed adjacent to the display region.

The display panel 100 includes a plurality of gate lines GWL, GCL, GIL and EBL, a plurality of data lines DL, a plurality of emission lines EM1L and EM2L and a plurality of pixels electrically connected to the gate lines GWL, GCL, GIL and EBL, the data lines DL and the emission lines EM1L and EM2L. The gate lines GWL, GCL, GIL and EBL may extend in a first direction D1, the data lines DL may extend in a second direction D2 crossing the first direction D1 and the emission lines EM1L and EM2L may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GCL, GIL and EBL in response to the first control signal CONT1 received from the driving controller 200. The gate driver 300 may sequentially output the gate signals to the gate lines GWL, GCL, GIL and EBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be embedded in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF received from the gamma reference voltage generator 400. The data driver 500 outputs the data voltages to the data lines DL.

The emission driver 600 generates emission signals to drive the emission lines EM1L and EM2L in response to the fourth control signal CONT4 received from the driving controller 200. The emission driver 600 may output the emission signals to the emission lines EM1L and EM2L.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, the gate driver 300 and the emission driver 600 may be integrally formed. For example, both of the gate driver 300 and the emission driver 600 may be disposed at both sides of the display panel 100.

Figure 2:
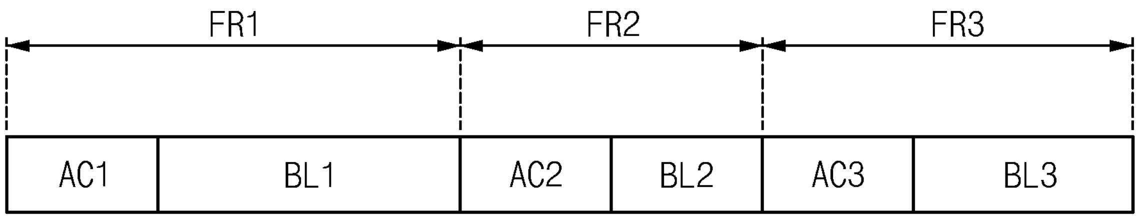
FIG. 2 is a conceptual diagram illustrating a driving frequency of a display panel of FIG. 1.

FIG. 2 is a conceptual diagram illustrating a driving frequency of the display panel 100 of FIG. 1.

Referring to FIGS. 1 and 2, the display panel 100 may be driven in a variable frequency. A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The first active period AC1 may have a length substantially the same as a length of the second active period AC2. The first blank period BL1 may have a length different from a length of the second blank period BL2.

The second active period AC2 may have the length substantially the same as a length of the third active period AC3. The second blank period BL2 may have the length different from a length of the third blank period BL3.

The display apparatus supporting the variable frequency may include a data writing duration in which the data voltage is written to the pixel and a self scan duration in which only light emission is operated without writing the data voltage to the pixel. The data writing duration may be disposed in the active period AC1, AC2 and AC3. The self scan duration may be disposed in the blank period BL1, BL2 and BL3.

Figure 3:
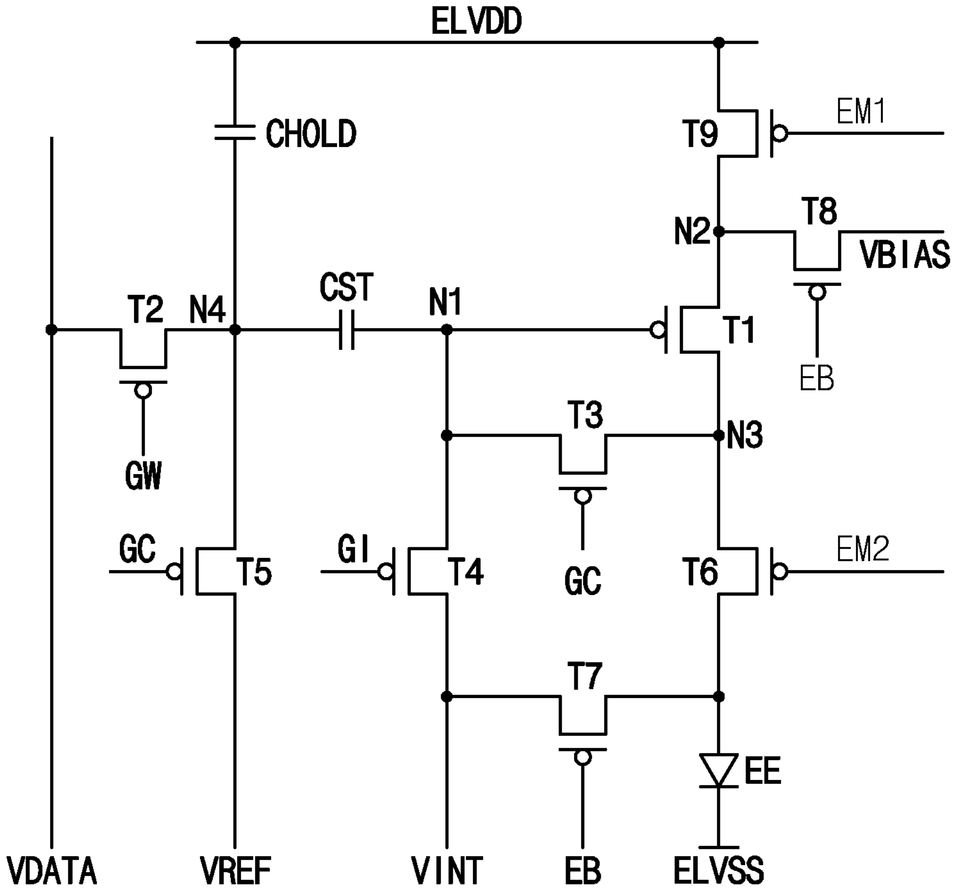
FIG. 3 is a circuit diagram illustrating an example of a pixel of the display panel of FIG. 1.

FIG. 3 is a circuit diagram illustrating an example of a pixel of the display panel 100 of FIG. 1.

Referring to FIGS. 1 to 3, the pixel may emit a light based on a data writing gate signal GW, a data initialization gate signal GI, a compensation gate signal GC, the emission signal EM1 and EM2 and the data voltage VDATA.

A frequency of at least one of the data initialization gate signal GI and the compensation gate signal GC may be different from a frequency of the data writing gate signal GW. The frequency of at least one of the data initialization gate signal GI and the compensation gate signal GC may be less than the frequency of the data writing gate signal GW. When the data writing gate signal GW is driven in a maximum frequency in the variable frequency driving, the frequency of at least one of the data initialization gate signal GI and the compensation gate signal GC may be less than the frequency of the data writing gate signal GW.

The pixel includes a light emitting element EE, a first transistor T1 applying a driving current to the light emitting element EE and a second transistor T2 writing the data voltage VDATA to a storage capacitor CST. The data writing gate signal GW may be applied to a control electrode of the second transistor T2.

The pixel may further include a third transistor T3 connected to a control electrode of the first transistor T1 and a second electrode of the first transistor T1. The compensation gate signal GC may be applied to a control electrode of the third transistor T3.

The pixel may further include a fifth transistor T5 applying a reference voltage VREF to a second electrode of the second transistor T2. The compensation gate signal GC may be applied to a control electrode of the fifth transistor T5.

The pixel may further include a fourth transistor T4 applying an initialization voltage VINT to the control electrode of the first transistor T1. The data initialization gate signal GI may be applied to a control electrode of the fourth transistor T4.

Specifically, the pixel may include the first transistor T1 including the control electrode connected to a first node N1, a first electrode connected to a second node N2 and the second electrode connected to a third node N3, the second transistor T2 including the control electrode receiving the data writing gate signal GW, a first electrode receiving the data voltage VDATA and the second electrode connected to a fourth node N4, the third transistor T3 including the control electrode receiving the compensation gate signal GC, a first electrode connected to the first node N1 and a second electrode connected to the third node N3, the fourth transistor T4 including the control electrode receiving the data initialization gate signal GI, a first electrode receiving the initialization voltage VINT and a second electrode connected to the first node N1, the fifth transistor T5 including the control electrode receiving the compensation gate signal GC, a first electrode receiving the reference voltage VREF and a second electrode connected to the fourth node N4, a sixth transistor T6 including a control electrode receiving a second emission signal EM2, a first electrode connected to the third node N3 and a second electrode connected to an anode electrode of the light emitting element EE, a seventh transistor T7 including a control electrode receiving a light emitting element initialization gate signal EB, a first electrode receiving the initialization voltage VINT and a second electrode connected to the anode electrode of the light emitting element EE, an eighth transistor T8 including a control electrode receiving the light emitting element initialization gate signal EB, a first electrode receiving a bias voltage VBIAS and a second electrode connected to the second node N2 and a ninth transistor T9 including a control electrode receiving a first emission signal EM1, a first electrode receiving a high power voltage ELVDD and a second electrode connected to the second node N2.

The pixel may further include a hold capacitor CHOLD including a first electrode receiving the high power voltage ELVDD and a second electrode connected to the fourth node N4 and a storage capacitor CST including a first electrode connected to the fourth node N4 and a second electrode connected to the first node N1.

The anode electrode of the light emitting element EE may be connected to the sixth transistor T6 and the seventh transistor T7. A cathode electrode of the light emitting element EE may receive a low power voltage ELVSS.

The pixel circuit of the present inventive concept may not be limited to the pixel circuit of FIG. 3. The present inventive concept may be applied to pixels having a structure similar to a structure of the pixel of FIG. 3 and operating similarly to the pixel of FIG. 3.

Figure 4:
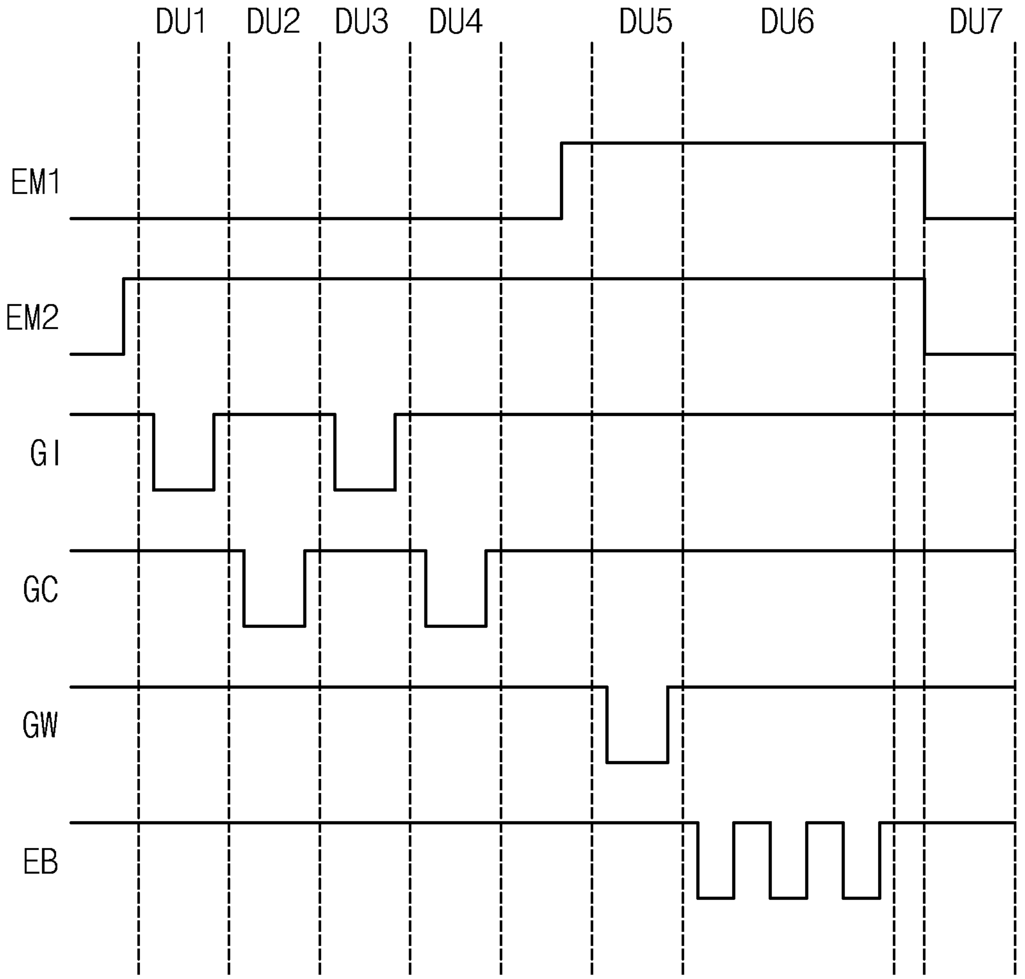
FIG. 4 is a timing diagram illustrating driving signals of the pixel of FIG. 3.

FIG. 4 is a timing diagram illustrating driving signals of the pixel of FIG. 3. FIG. 4 represents gate signals in the data writing duration in which the data voltage VDATA is written to the pixel.

Referring to FIGS. 1 to 4, in a data initialization period DU1 and DU3, the data initialization gate signal GI may have an active level, the compensation gate signal GC may have an inactive level and the data writing gate signal GW may have an inactive level. In the data initialization period DU1 and DU3, the first emission signal EM1 may have an active level, the second emission signal EM2 may have an inactive level and the light emitting element initialization gate signal EB may have an inactive level.

In the data initialization period DU1 and DU3, the initialization voltage VINT may be applied to the first node N1.

In a compensation period DU2 and DU4, the data initialization gate signal GI may have an inactive level, the compensation gate signal GC may have an active pulse and the data writing gate signal GW may have the inactive level. In the compensation period DU2 and DU4, the first emission signal EM1 may have the active level, the second emission signal EM2 may have the inactive level and the light emitting element initialization gate signal EB may have the inactive level.

In the compensation period DU2 and DU4, the reference voltage VREF may be applied to the fourth node N4 and a threshold voltage of the first transistor T1 may be compensated.

In a data writing period DU5, the data initialization gate signal GI may have the inactive level, the compensation gate signal GC may have the inactive level and the data writing gate signal GW may have an active pulse. In the data writing period DU5, the first emission signal EM1 may have an inactive level, the second emission signal EM2 may have the inactive level and the light emitting element initialization gate signal EB may have the inactive level.

In the data writing period DU5, the data voltage VDATA may be written to the storage capacitor CST.

In a light emitting element initialization and bias period DU6, the data initialization gate signal GI may have the inactive level, the compensation gate signal GC may have the inactive level and the data writing gate signal GW may have the inactive level. In the light emitting element initialization and bias period DU6, the first emission signal EM1 may have the inactive level, the second emission signal EM2 may have the inactive level and the light emitting element initialization gate signal EB may have an active pulse. For example, in the light emitting element initialization and bias period DU6, the light emitting element initialization gate signal EB may have a plurality of active pulses.

In the light emitting element initialization and bias period DU6, the initialization voltage VINT may be applied to the anode electrode of the light emitting element EE and the bias voltage VBIAS may be applied to the second node N2.

In a light emitting period DU7, the data initialization gate signal GI may have the inactive level, the compensation gate signal GC may have the inactive level, the data writing gate signal GW may have the inactive level and the light emitting element initialization gate signal EB may have the inactive level. In the light emitting period DU7, the first emission signal EM1 may have the active level and the second emission signal EM2 may have an active level.

In the light emitting period DU7, the light emitting element EE may emit a light corresponding to the data voltage VDATA.

As shown in FIG. 4, the data initialization period and the compensation period may be repeated multiple times prior to the data writing period DU5. Although the data initialization period and the compensation period are repeated twice prior to the data writing period DU5 in FIG. 4, the present inventive concept may not be limited thereto. Alternatively, the data initialization period and the compensation period may be repeated three times prior to the data writing period DU5. Alternatively, the data initialization period and the compensation period may be operated only once prior to the data writing period DU5. In addition, a number of operating times of the data initialization period and a number of operating times of the compensation period may be different from each other.

Figure 5:
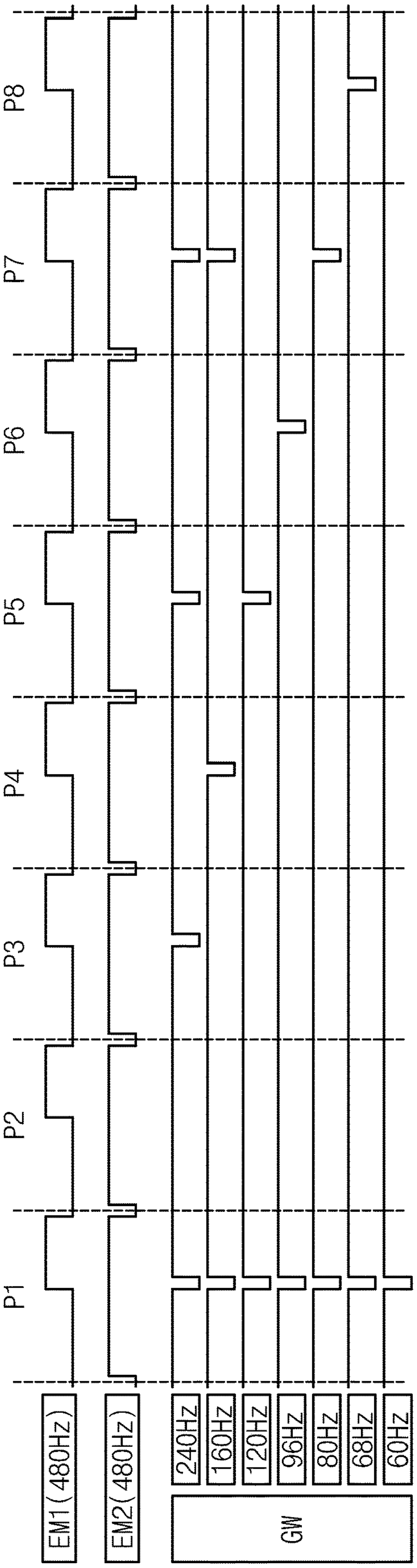
FIG. 5 is a timing diagram illustrating driving signals of the pixel of FIG. 3 in a variable frequency driving.

FIG. 5 is a timing diagram illustrating driving signals of the pixel of FIG. 3 in a variable frequency driving.

Referring to FIGS. 1 to 5, the display panel 100 may be driven in the variable frequency. For example, the display panel 100 may be driven in a maximum frequency of 240 Hz.

When the display panel 100 is driven in the frequency of 240 Hz (the maximum frequency), the data writing gate signal GW may have active pulses in a first period P1, a third period P3, a fifth period P5 and a seventh period P7 so that a data writing operation may be operated in the first period P1, the third period P3, the fifth period P5 and the seventh period P7. When the display panel 100 is driven in the frequency of 240 Hz, a light emitting operation may be performed once every two periods.

When the display panel 100 is driven in a frequency of 160 Hz, the data writing gate signal GW may have active pulses in the first period P1, a fourth period P4 and the seventh period P7 so that a data writing operation may be operated in the first period P1, the fourth period P4 and the seventh period P7. When the display panel 100 is driven in the frequency of 160 Hz, a light emitting operation may be performed once every three periods.

When the display panel 100 is driven in a frequency of 120 Hz, the data writing gate signal GW may have active pulses in the first period P1 and the fifth period P5 so that a data writing operation may be operated in the first period P1 and the fifth period P5. When the display panel 100 is driven in the frequency of 120 Hz, a light emitting operation may be performed once every four periods.

When the display panel 100 is driven in a frequency of 96 Hz, the data writing gate signal GW may have active pulses in the first period P1 and a sixth period P6 so that a data writing operation may be operated in the first period P1 and the sixth period P6. When the display panel 100 is driven in the frequency of 96 Hz, a light emitting operation may be performed once every five periods.

When the display panel 100 is driven in a frequency of 80 Hz, the data writing gate signal GW may have active pulses in the first period P1 and the seventh period P7 so that a data writing operation may be operated in the first period P1 and the seventh period P7. When the display panel 100 is driven in the frequency of 80 Hz, a light emitting operation may be performed once every six periods.

When the display panel 100 is driven in a frequency of 68 Hz (about 68.57 Hz), the data writing gate signal GW may have active pulses in the first period P1 and an eighth period P8 so that a data writing operation may be operated in the first period P1 and the eighth period P8. When the display panel 100 is driven in the frequency of 68 Hz, a light emitting operation may be performed once every seven periods.

When the display panel 100 is driven in a frequency of 60 Hz, the data writing gate signal GW may have active pulses in the first period P1 and a ninth period so that a data writing operation may be operated in the first period P1 and the ninth period. When the display panel 100 is driven in the frequency of 60 Hz, a light emitting operation may be performed once every eight periods.

When the display panel 100 is driven in the frequency of 240 Hz, an emission operation EM1 and EM2 of the light emission element EE may be operated in a frequency of 480 Hz and an initialization operation EB of the light emission element EE may be operated in the frequency of 480 Hz.

As explained above, when the display panel 100 is driven in the frequency of 240 Hz and the emission operation is operated in the frequency of 480 Hz, it may be referred as the display panel 100 operates in two cycles.

Although the display panel 100 is driven in a frequency less than 240 Hz, the emission operation EM1 and EM2 of the light emission element EE may be operated in the frequency of 480 Hz and the initialization operation EB of the light emission element EE may be operated in the frequency of 480 Hz.

Figure 6:
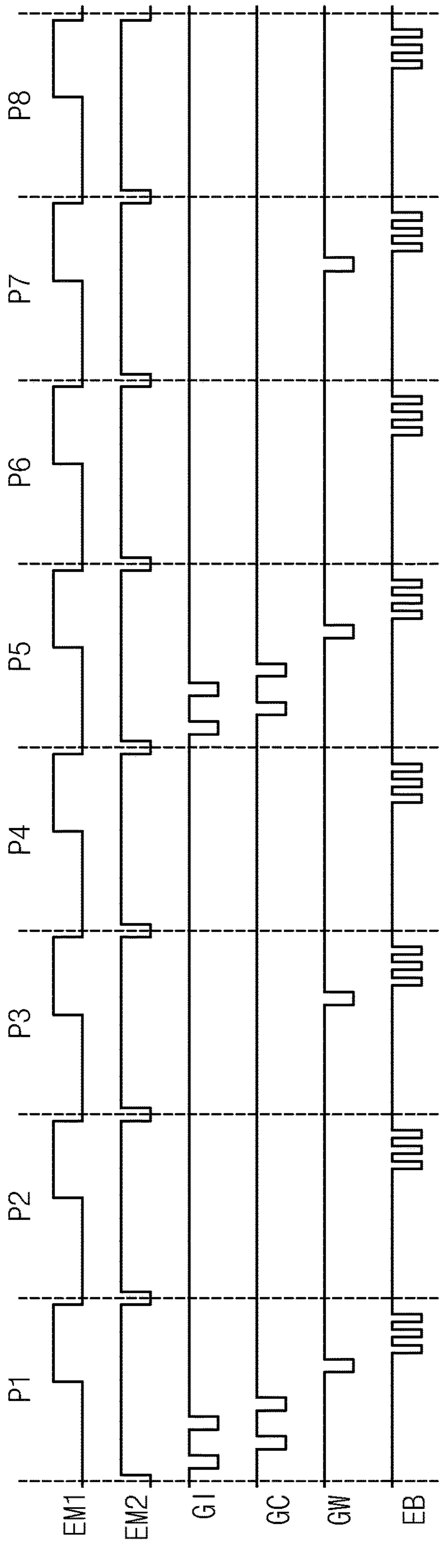
FIG. 6 is a timing diagram illustrating an example of driving signals of the pixel of FIG. 3 when the driving frequency of the display panel is a maximum frequency.
Figure 7:
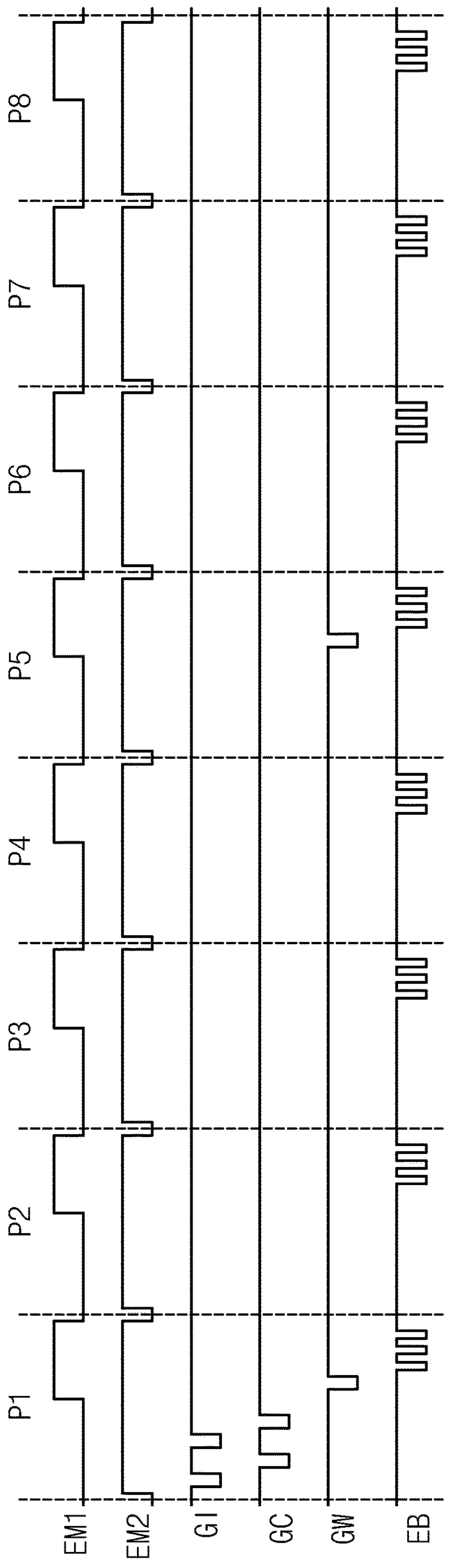
FIG. 7 is a timing diagram illustrating an example of driving signals of the pixel of FIG. 3 when the driving frequency of the display panel is less than the maximum frequency.

FIG. 6 is a timing diagram illustrating an example of driving signals of the pixel of FIG. 3 when the driving frequency of the display panel 100 is the maximum frequency (240 Hz). FIG. 7 is a timing diagram illustrating an example of driving signals of the pixel of FIG. 3 when the driving frequency of the display panel 100 is less than the maximum frequency.

FIG. 6 represents the driving signals of the pixel when the driving frequency of the display panel 100 is 240 Hz. FIG. 7 represents the driving signals of the pixel when the driving frequency of the display panel 100 is 120 Hz.

Referring to FIGS. 1 to 7, the frequency of at least one of the data initialization gate signal GI and the compensation gate signal GC is less than the frequency of the data writing gate signal GW.

In the present embodiment, as shown in FIG. 6, the frequency of the data initialization gate signal GI may be less than the frequency of the data writing gate signal GW and the frequency of the compensation gate signal GC may be less than the frequency of the data writing gate signal GW.

Herein, when determining the frequency of the data initialization gate signal GI, the frequency of the compensation gate signal GC and the frequency of the data writing gate signal GW, it is not considered that the signal has multiple pulses within one period (one frame).

For example, the data writing gate signal GW has active pulses in the first, third, fifth and seventh periods P1, P3, P5 and P7 in FIG. 6 so that the frequency of the data writing gate signal GW may be 240 Hz in FIG. 6.

The data initialization gate signal GI has active pulses in the first and fifth periods P1 and P5 in FIG. 6 so that the frequency of the data initialization gate signal GI may be 120 Hz in FIG. 6.

The compensation gate signal GC has active pulses in the first and fifth periods P1 and P5 in FIG. 6 so that the frequency of the compensation gate signal GC may be 120 Hz in FIG. 6.

Although the frequency of the data initialization gate signal GI and the frequency of the compensation gate signal GC are half of the frequency of the data writing gate signal GW in FIG. 6 for convenience of explanation, the present inventive concept may not be limited thereto.

The frequencies of the emission signals EM1 and EM2 may be greater than the frequency of the data writing gate signal GW.

In the first period P1 of FIG. 6, the data initialization gate signal GI has the active pulse, the compensation gate signal GC has the active pulse, the data writing gate signal GW has the active pulse and the emission signals EM1 and EM2 have active periods. In the first period P1 of FIG. 6, the light emitting element initialization gate signal EB has the active pulse. The first period P1 of FIG. 6 may be a normal data writing duration in which a data initialization, a threshold voltage compensation, a data writing and a light emission are operated.

In a second period P2 of FIG. 6 subsequent to the first period P1 of FIG. 6, the data initialization gate signal GI does not have the active pulse, the compensation gate signal GC does not have the active pulse, the data writing gate signal GW does not have the active pulse and the emission signals EM1 and EM2 have the active periods. In the second period P2 of FIG. 6, the light emitting element initialization gate signal EB has the active pulse. The second period P2 of FIG. 6 may be the self scan duration in which the data initialization, the threshold voltage compensation and the data writing are not operated but the light emission is operated.

In the third period P3 of FIG. 6 subsequent to the second period P2 of FIG. 6, at least one of the data initialization gate signal GI and the compensation gate signal GC does not have the active pulse, the data writing gate signal GW has the active pulse and the emission signals EM1 and EM2 have the active periods. In the third period P3 of FIG. 6, the light emitting element initialization gate signal EB has the active pulse.

In the present embodiment, in the third period P3 of FIG. 6, the data initialization gate signal GI does not have the active pulse and the compensation gate signal GC does not have the active pulse.

The third period P3 of FIG. 6 may be a power reducing duration in which the data initialization gate signal GI and the compensation gate signal GC do not have the active pulse but the data writing gate signal GW has the active pulse.

A fourth period P4 of FIG. 6 subsequent to the third period P3 of FIG. 6 may be the self scan duration in which the data initialization, the threshold voltage compensation and the data writing are not operated but the light emission is operated.

The fifth period P5 subsequent to the fourth period P4 in FIG. 6 may be the normal data writing duration like the first period P1 of FIG. 6. A sixth period P6 subsequent to the fifth period P5 in FIG. 6 may be the self scan duration like the second period P2 of FIG. 6. The seventh period P7 subsequent to the sixth period P6 in FIG. 6 may be the power reducing duration like the third period P3 of FIG. 6. An eighth period P8 subsequent to the seventh period P7 in FIG. 6 may be the self scan duration like the fourth period P4 of FIG. 6.

FIG. 7 represents a case in which the driving frequency of the display panel 100 is reduced from the maximum frequency in the variable frequency driving. When the frequency of the data writing gate signal GW is reduced in the variable frequency driving, the frequencies of the data initialization gate signal GI and the compensation gate signal GC may also be reduced.

A first period P1 of FIG. 7 may be the normal data writing duration in which a data initialization, a threshold voltage compensation, a data writing and a light emission are operated.

Second to fourth periods P2 to P4 and sixth to eighth periods P6 to P8 of FIG. 7 may be the self scan durations in which the data initialization, the threshold voltage compensation and the data writing are not operated but the light emission is operated.

A fifth period P5 of FIG. 7 may be the power reducing duration in which the data initialization gate signal GI and the compensation gate signal GC do not have the active pulse but the data writing gate signal GW has the active pulse.

According to the present embodiment, in the display apparatus supporting the variable frequency, the frequency of at least one of the data initialization gate signal GI and the compensation gate signal GC may be set to be different from the frequency of the data writing gate signal GW so that the power consumption of the display apparatus may be reduced. For example, in the display apparatus supporting the variable frequency, the frequency of at least one of the data initialization gate signal GI and the compensation gate signal GC may be set to be less than the frequency of the data writing gate signal GW so that the power consumption of the display apparatus may be reduced.

Figure 8:
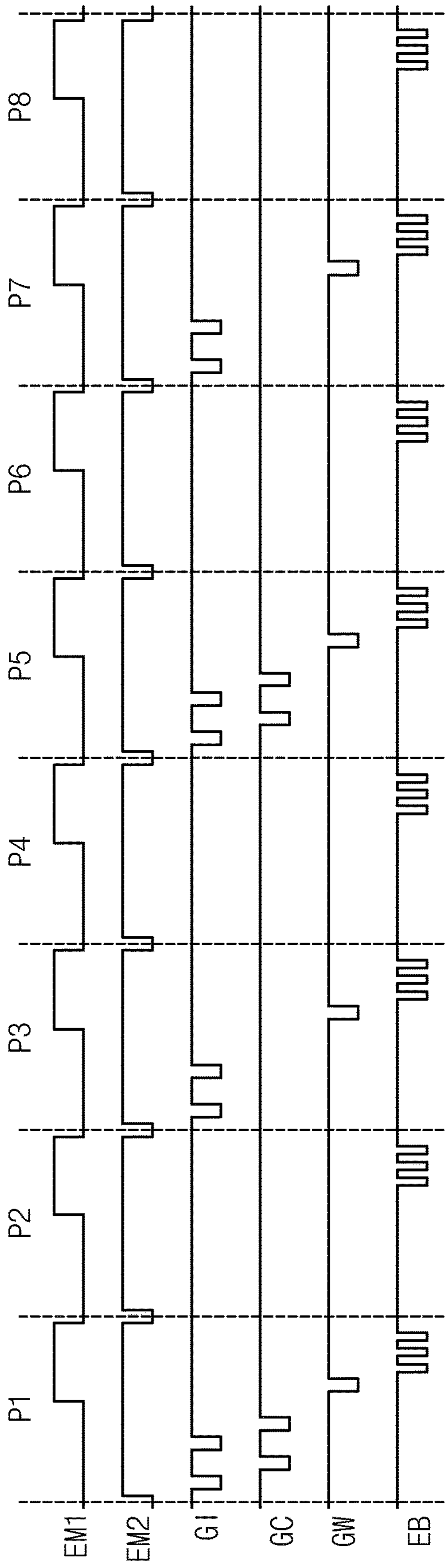
FIG. 8 is a timing diagram illustrating an example of driving signals of a pixel according to an embodiment of the present inventive concept when a driving frequency of a display panel is a maximum frequency.

FIG. 8 is a timing diagram illustrating an example of driving signals of a pixel according to an embodiment of the present inventive concept when a driving frequency of a display panel 100 is a maximum frequency.

The pixel driving signals according to the present embodiment are substantially the same as the pixel driving signals of FIG. 6 except that the frequency of the compensation gate signal GC is less than the frequency of the data writing gate signal GW and the frequency of the data initialization gate signal GI is the same as the frequency of the data writing gate signal GW. Thus, the same reference numerals will be used to refer to the same or like parts as those described in the previous embodiment of FIGS. 1 to 7 and any repetitive explanation concerning the above elements will be omitted.

Referring to FIGS. 1 to 5 and 8, the pixel may emit a light based on a data writing gate signal GW, a data initialization gate signal GI, a compensation gate signal GC, an emission signal EM1 and EM2 and a data voltage VDATA. The pixel in the present embodiment may be the same as or different from the pixel in FIG. 3.

A frequency of at least one of the data initialization gate signal GI and the compensation gate signal GC may be different from a frequency of the data writing gate signal GW. The frequency of at least one of the data initialization gate signal GI and the compensation gate signal GC may be less than the frequency of the data writing gate signal GW. When the data writing gate signal GW is driven in a maximum frequency in the variable frequency driving, the frequency of at least one of the data initialization gate signal GI and the compensation gate signal GC may be less than the frequency of the data writing gate signal GW.

In the present embodiment, as shown in FIG. 8, the frequency of the data initialization gate signal GI may be the same as the frequency of the data writing gate signal GW and the frequency of the compensation gate signal GC may be less than the frequency of the data writing gate signal GW.

In a first period P1 of FIG. 8, the data initialization gate signal GI has an active pulse, the compensation gate signal GC has an active pulse, the data writing gate signal GW has an active pulse and the emission signals EM1 and EM2 have active periods. In the first period P1 of FIG. 8, the light emitting element initialization gate signal EB has an active pulse. The first period P1 of FIG. 8 may be a normal data writing duration in which a data initialization, a threshold voltage compensation, a data writing and a light emission are operated.

In a second period P2 of FIG. 8 subsequent to the first period P1 of FIG. 8, the data initialization gate signal GI does not have the active pulse, the compensation gate signal GC does not have the active pulse, the data writing gate signal GW does not have the active pulse and the emission signals EM1 and EM2 have the active periods. In the second period P2 of FIG. 8, the light emitting element initialization gate signal EB has the active pulse. The second period P2 of FIG. 8 may be a self scan duration in which the data initialization, the threshold voltage compensation and the data writing are not operated but the light emission is operated.

In a third period P3 of FIG. 8 subsequent to the second period P2 of FIG. 8, at least one of the data initialization gate signal GI and the compensation gate signal GC does not have the active pulse, the data writing gate signal GW has the active pulse and the emission signals EM1 and EM2 have the active periods. In the third period P3 of FIG. 8, the light emitting element initialization gate signal EB has the active pulse.

In the present embodiment, in the third period P3 of FIG. 8, the data initialization gate signal GI has the active pulse and the compensation gate signal GC does not have the active pulse.

The third period P3 of FIG. 8 may be a power reducing duration in which the compensation gate signal GC does not have the active pulse but the data initialization gate signal GI and the data writing gate signal GW have the active pulses.

According to the present embodiment, in the display apparatus supporting the variable frequency, the frequency of at least one of the data initialization gate signal GI and the compensation gate signal GC may be set to be different from the frequency of the data writing gate signal GW so that the power consumption of the display apparatus may be reduced. For example, in the display apparatus supporting the variable frequency, the frequency of at least one of the data initialization gate signal GI and the compensation gate signal GC may be set to be less than the frequency of the data writing gate signal GW so that the power consumption of the display apparatus may be reduced.

Figure 9:
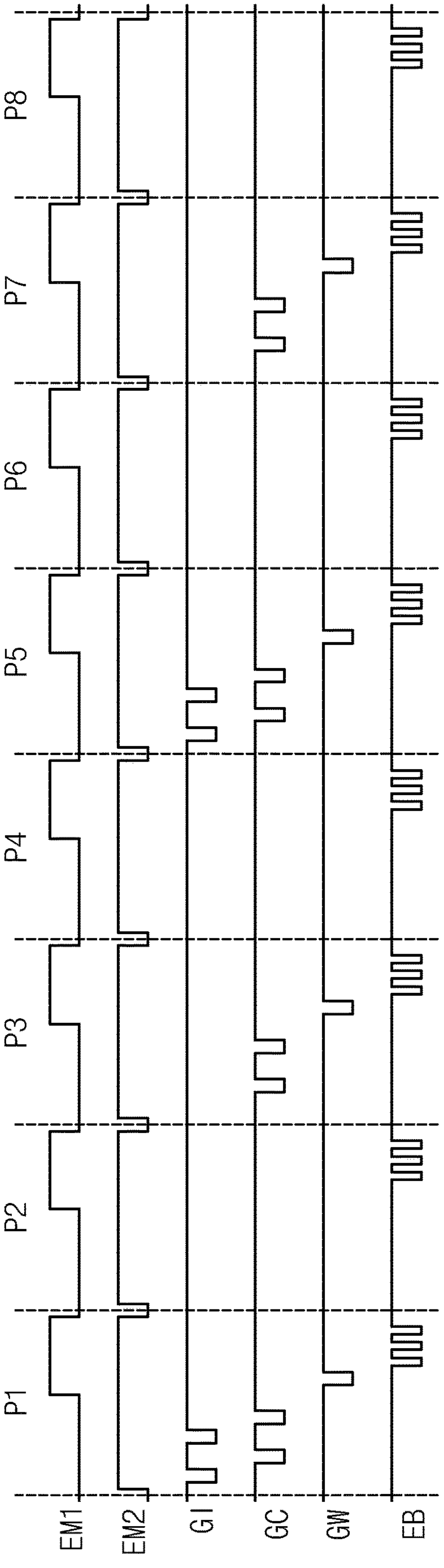
FIG. 9 is a timing diagram illustrating an example of driving signals of a pixel according to an embodiment of the present inventive concept when a driving frequency of a display panel is a maximum frequency.

FIG. 9 is a timing diagram illustrating an example of driving signals of a pixel according to an embodiment of the present inventive concept when a driving frequency of a display panel 100 is a maximum frequency.

The pixel driving signals according to the present embodiment are substantially the same as the pixel driving signals of FIG. 6 except that the frequency of the data initialization gate signal GI is less than the frequency of the data writing gate signal GW and the frequency of the compensation gate signal GC is the same as the frequency of the data writing gate signal GW. Thus, the same reference numerals will be used to refer to the same or like parts as those described in the previous embodiment of FIGS. 1 to 7 and any repetitive explanation concerning the above elements will be omitted.

Referring to FIGS. 1 to 5 and 9, the pixel may emit a light based on a data writing gate signal GW, a data initialization gate signal GI, a compensation gate signal GC, an emission signal EM1 and EM2 and a data voltage VDATA. The pixel in the present embodiment may be the same as or different from the pixel in FIG. 3.

A frequency of at least one of the data initialization gate signal GI and the compensation gate signal GC may be different from a frequency of the data writing gate signal GW. The frequency of at least one of the data initialization gate signal GI and the compensation gate signal GC may be less than the frequency of the data writing gate signal GW. When the data writing gate signal GW is driven in a maximum frequency in the variable frequency driving, the frequency of at least one of the data initialization gate signal GI and the compensation gate signal GC may be less than the frequency of the data writing gate signal GW.

In the present embodiment, as shown in FIG. 9, the frequency of the compensation gate signal GC may be the same as the frequency of the data writing gate signal GW and the frequency of the data initialization gate signal GI may be less than the frequency of the data writing gate signal GW.

In a first period P1 of FIG. 9, the data initialization gate signal GI has an active pulse, the compensation gate signal GC has an active pulse, the data writing gate signal GW has an active pulse and the emission signals EM1 and EM2 have active periods. In the first period P1 of FIG. 9, the light emitting element initialization gate signal EB has an active pulse. The first period P1 of FIG. 9 may be a normal data writing duration in which a data initialization, a threshold voltage compensation, a data writing and a light emission are operated.

In a second period P2 of FIG. 9 subsequent to the first period P1 of FIG. 9, the data initialization gate signal GI does not have the active pulse, the compensation gate signal GC does not have the active pulse, the data writing gate signal GW does not have the active pulse and the emission signals EM1 and EM2 have the active periods. In the second period P2 of FIG. 9, the light emitting element initialization gate signal EB has the active pulse. The second period P2 of FIG. 9 may be a self scan duration in which the data initialization, the threshold voltage compensation and the data writing are not operated but the light emission is operated.

In a third period P3 of FIG. 9 subsequent to the second period P2 of FIG. 9, at least one of the data initialization gate signal GI and the compensation gate signal GC does not have the active pulse, the data writing gate signal GW has the active pulse and the emission signals EM1 and EM2 have the active periods. In the third period P3 of FIG. 9, the light emitting element initialization gate signal EB has the active pulse.

In the present embodiment, in the third period P3 of FIG. 9, the data initialization gate signal GI does not have the active pulse and the compensation gate signal GC has the active pulse.

The third period P3 of FIG. 9 may be a power reducing duration in which the data initialization gate signal GI does not have the active pulse but the compensation gate signal GC and the data writing gate signal GW have the active pulses.

According to the present embodiment, in the display apparatus supporting the variable frequency, the frequency of at least one of the data initialization gate signal GI and the compensation gate signal GC may be set to be different from the frequency of the data writing gate signal GW so that the power consumption of the display apparatus may be reduced. For example, in the display apparatus supporting the variable frequency, the frequency of at least one of the data initialization gate signal GI and the compensation gate signal GC may be set to be less than the frequency of the data writing gate signal GW so that the power consumption of the display apparatus may be reduced.

Figure 10:
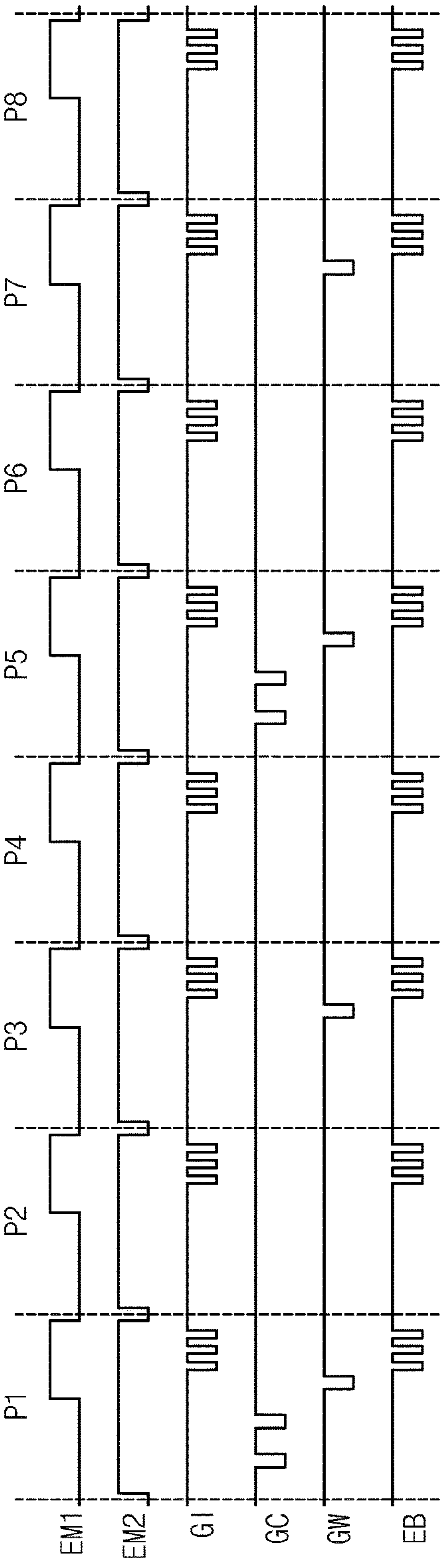
FIG. 10 is a timing diagram illustrating an example of driving signals of a pixel according to an embodiment of the present inventive concept when a driving frequency of a display panel is a maximum frequency.

FIG. 10 is a timing diagram illustrating an example of driving signals of a pixel according to an embodiment of the present inventive concept when a driving frequency of a display panel 100 is a maximum frequency.

The pixel driving signals according to the present embodiment are substantially the same as the pixel driving signals of FIG. 6 except that the frequency of the compensation gate signal GC is less than the frequency of the data writing gate signal GW and the frequency of the data initialization gate signal GI is the same as the frequency of the emission signals EM1 and EM2. Thus, the same reference numerals will be used to refer to the same or like parts as those described in the previous embodiment of FIGS. 1 to 7 and any repetitive explanation concerning the above elements will be omitted.

Referring to FIGS. 1 to 5 and 10, the pixel may emit a light based on a data writing gate signal GW, a data initialization gate signal GI, a compensation gate signal GC, an emission signal EM1 and EM2 and a data voltage VDATA. The pixel in the present embodiment may be the same as or different from the pixel in FIG. 3.

A frequency of at least one of the data initialization gate signal GI and the compensation gate signal GC may be different from a frequency of the data writing gate signal GW. The frequency of at least one of the data initialization gate signal GI and the compensation gate signal GC may be less than the frequency of the data writing gate signal GW. When the data writing gate signal GW is driven in a maximum frequency in the variable frequency driving, the frequency of at least one of the data initialization gate signal GI and the compensation gate signal GC may be less than the frequency of the data writing gate signal GW.

In the present embodiment, as shown in FIG. 10, the frequency of the data initialization gate signal GI may be the same as the frequency of the emission signal EM1 and EM2 and the frequency of the compensation gate signal GC may be less than the frequency of the data writing gate signal GW.

For example, in FIG. 10, a waveform of the data initialization gate signal GI is the same as a waveform of the light emitting element initialization gate signal EB.

In a first period P1 of FIG. 10, the data initialization gate signal GI has an active pulse, the compensation gate signal GC has an active pulse, the data writing gate signal GW has an active pulse and the emission signals EM1 and EM2 have active periods. In the first period P1 of FIG. 10, the light emitting element initialization gate signal EB has an active pulse. The first period P1 of FIG. 10 may be a normal data writing duration in which a data initialization, a threshold voltage compensation, a data writing and a light emission are operated.

In a second period P2 of FIG. 10 subsequent to the first period P1 of FIG. 10, the data initialization gate signal GI has the active pulse, the compensation gate signal GC does not have the active pulse, the data writing gate signal GW does not have the active pulse and the emission signals EM1 and EM2 have the active periods. In the second period P2 of FIG. 10, the light emitting element initialization gate signal EB has the active pulse. The second period P2 of FIG. 10 may be a self scan duration in which the threshold voltage compensation and the data writing are not operated but the data initialization and the light emission is operated.

In a third period P3 of FIG. 10 subsequent to the second period P2 of FIG. 10, at least one of the data initialization gate signal GI and the compensation gate signal GC does not have the active pulse, the data writing gate signal GW has the active pulse and the emission signals EM1 and EM2 have the active periods. In the third period P3 of FIG. 10, the light emitting element initialization gate signal EB has the active pulse.

In the present embodiment, in the third period P3 of FIG. 10, the data initialization gate signal GI has the active pulse and the compensation gate signal GC does not have the active pulse.

The third period P3 of FIG. 10 may be a power reducing duration in which the compensation gate signal GC does not have the active pulse but the data initialization gate signal GI and the data writing gate signal GW have the active pulses.

According to the present embodiment, in the display apparatus supporting the variable frequency, the frequency of at least one of the data initialization gate signal GI and the compensation gate signal GC may be set to be different from the frequency of the data writing gate signal GW so that the power consumption of the display apparatus may be reduced. For example, in the display apparatus supporting the variable frequency, the frequency of at least one of the data initialization gate signal GI and the compensation gate signal GC may be set to be less than the frequency of the data writing gate signal GW so that the power consumption of the display apparatus may be reduced.

Figure 11:
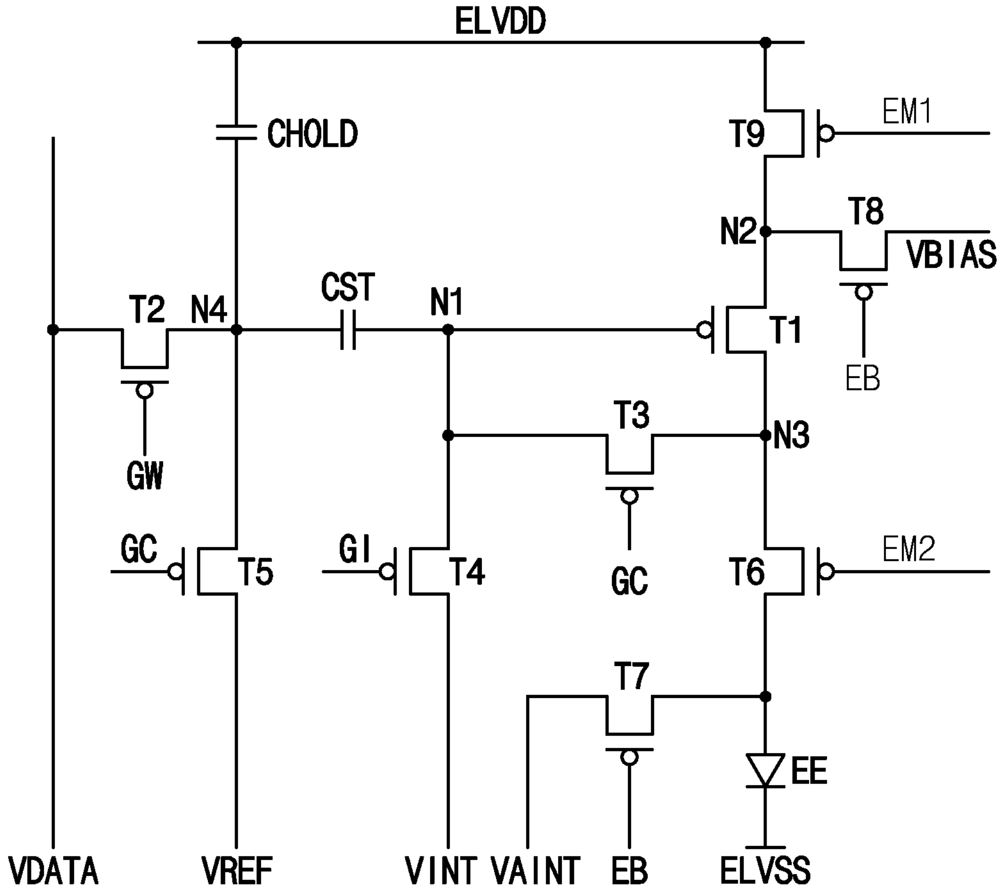
FIG. 11 is a circuit diagram illustrating an example of a pixel of the display panel of FIG. 1.

FIG. 11 is a circuit diagram illustrating an example of a pixel of the display panel 100 of FIG. 1.

The pixel according to the present embodiment is substantially the same as the pixel of FIG. 3 except that an initialization voltage applied to the seventh transistor is different from an initialization voltage applied to the fourth transistor. Thus, the same reference numerals will be used to refer to the same or like parts as those described in the previous embodiment of FIGS. 1 to 7 and any repetitive explanation concerning the above elements will be omitted.

Referring to FIGS. 1, 2, 4 to 7 and 11, the pixel may emit a light based on a data writing gate signal GW, a data initialization gate signal GI, a compensation gate signal GC, an emission signal EM1 and EM2 and a data voltage VDATA.

A frequency of at least one of the data initialization gate signal GI and the compensation gate signal GC may be different from a frequency of the data writing gate signal GW. The frequency of at least one of the data initialization gate signal GI and the compensation gate signal GC may be less than the frequency of the data writing gate signal GW. When the data writing gate signal GW is driven in a maximum frequency in the variable frequency driving, the frequency of at least one of the data initialization gate signal GI and the compensation gate signal GC may be less than the frequency of the data writing gate signal GW.

The pixel includes a light emitting element EE, a first transistor T1 applying a driving current to the light emitting element EE and a second transistor T2 writing the data voltage VDATA to the storage capacitor CST. The data writing gate signal GW may be applied to a control electrode of the second transistor T2.

The pixel may further include a third transistor T3 connected to a control electrode of the first transistor T1 and a second electrode of the first transistor T1. The compensation gate signal GC may be applied to a control electrode of the third transistor T3.

The pixel may further include a fifth transistor T5 applying a reference voltage VREF to a second electrode of the second transistor T2. The compensation gate signal GC may be applied to a control electrode of the fifth transistor T5.

The pixel may further include a fourth transistor T4 applying a first initialization voltage VINT to the control electrode of the first transistor T1. The data initialization gate signal GI may be applied to a control electrode of the fourth transistor T4.

Specifically, the pixel may include the first transistor T1 including the control electrode connected to a first node N1, a first electrode connected to a second node N2 and the second electrode connected to a third node N3, the second transistor T2 including the control electrode receiving the data writing gate signal GW, a first electrode receiving the data voltage VDATA and the second electrode connected to a fourth node N4, the third transistor T3 including the control electrode receiving the compensation gate signal GC, a first electrode connected to the first node N1 and a second electrode connected to the third node N3, the fourth transistor T4 including the control electrode receiving the data initialization gate signal GI, a first electrode receiving the first initialization voltage VINT and a second electrode connected to the first node N1, the fifth transistor T5 including the control electrode receiving the compensation gate signal GC, a first electrode receiving the reference voltage VREF and a second electrode connected to the fourth node N4, a sixth transistor T6 including a control electrode receiving a second emission signal EM2, a first electrode connected to the third node N3 and a second electrode connected to an anode electrode of the light emitting element EE, a seventh transistor T7 including a control electrode receiving a light emitting element initialization gate signal EB, a first electrode receiving a second initialization voltage VAINT and a second electrode connected to the anode electrode of the light emitting element EE, an eighth transistor T8 including a control electrode receiving the light emitting element initialization gate signal EB, a first electrode receiving a bias voltage VBIAS and a second electrode connected to the second node N2 and a ninth transistor T9 including a control electrode receiving a first emission signal EM1, a first electrode receiving a high power voltage ELVDD and a second electrode connected to the second node N2.

The pixel may further include a hold capacitor CHOLD including a first electrode receiving the high power voltage ELVDD and a second electrode connected to the fourth node N4 and a storage capacitor CST including a first electrode connected to the fourth node N4 and a second electrode connected to the first node N1.

The anode electrode of the light emitting element EE may be connected to the sixth transistor T6 and the seventh transistor T7. A cathode electrode of the light emitting element EE may receive a low power voltage ELVSS.

The pixel circuit of the present inventive concept may not be limited to the pixel circuit of FIG. 11. The present inventive concept may be applied to pixels having a structure similar to a structure of the pixel of FIG. 11 and operating similarly to the pixel of FIG. 11.

According to the present embodiment, in the display apparatus supporting the variable frequency, the frequency of at least one of the data initialization gate signal GI and the compensation gate signal GC may be set to be different from the frequency of the data writing gate signal GW so that the power consumption of the display apparatus may be reduced. For example, in the display apparatus supporting the variable frequency, the frequency of at least one of the data initialization gate signal GI and the compensation gate signal GC may be set to be less than the frequency of the data writing gate signal GW so that the power consumption of the display apparatus may be reduced.

Figure 12:
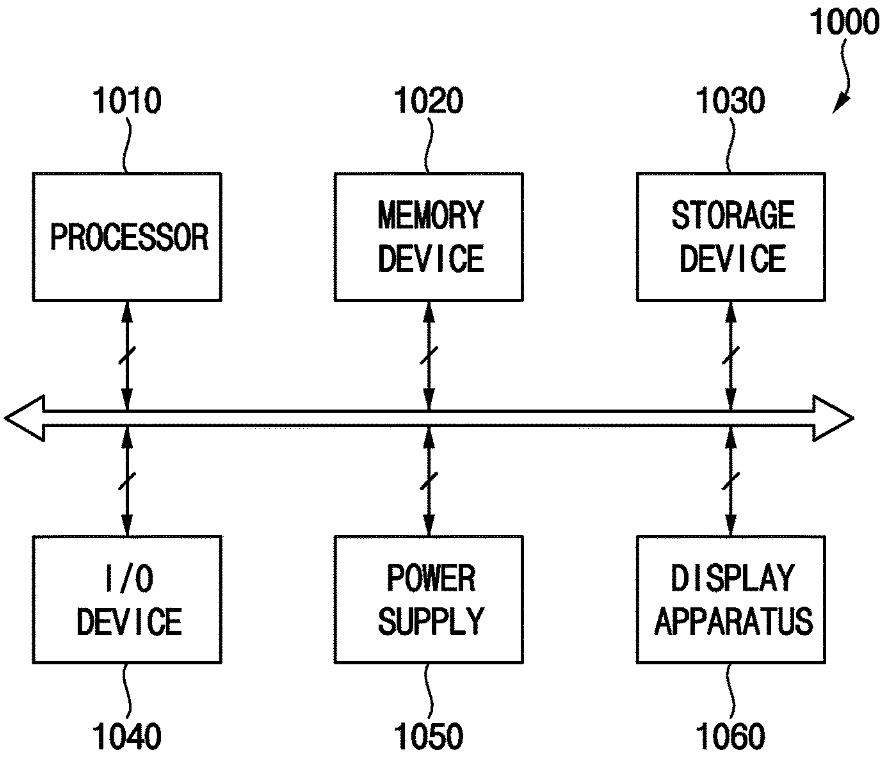
FIG. 12 is a block diagram illustrating an electronic apparatus according to an embodiment of the present inventive concept.
Figure 13:
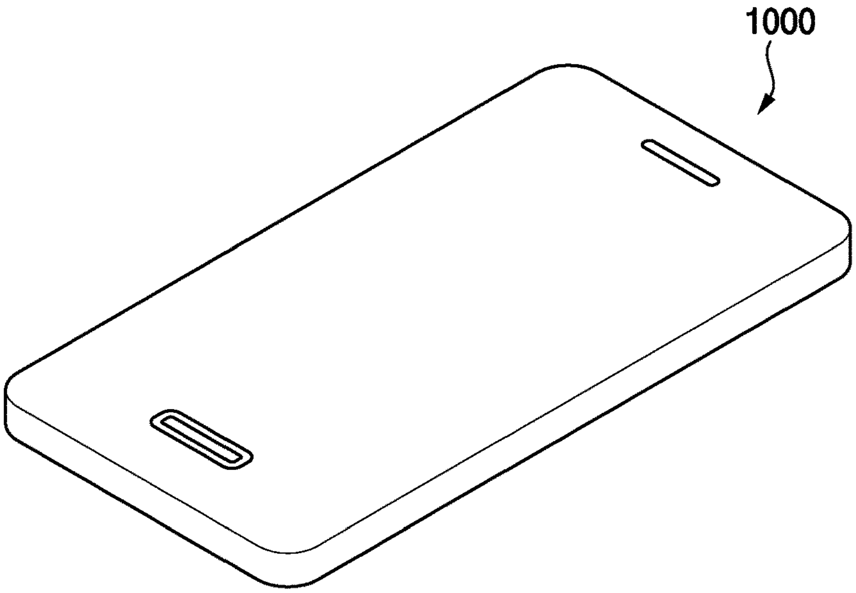
FIG. 13 is a diagram illustrating an example in which the electronic apparatus of FIG. 12 is implemented as a smart phone.

FIG. 12 is a block diagram illustrating an electronic apparatus according to an embodiment of the present inventive concept. FIG. 13 is a diagram illustrating an example in which the electronic apparatus of FIG. 12 is implemented as a smart phone.

Referring to FIGS. 1 to 13, the electronic apparatus 1000 may include a processor 1010, a memory device 1020, a storage device 1030, an input/output (I/O) device 1040, a power supply 1050 and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 13, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the display apparatus of the present embodiment as explained above, the power consumption may be reduced in the display apparatus supporting a variable frequency.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel is configured to emit light based on a data writing gate signal, a data initialization gate signal, a compensation gate signal, the emission signal and the data voltage, and wherein when the data writing gate signal is driven in a maximum frequency in a variable frequency driving, a frequency of at least one of the data initialization gate signal and the compensation gate signal is less than a frequency of the data writing gate signal.

2. The display apparatus of claim 1, wherein, when the frequency of the data writing gate signal is reduced in the variable frequency driving, the frequency of at least one of the data initialization gate signal and the compensation gate signal is reduced.

3. The display apparatus of claim 1, wherein a frequency of the emission signal is greater than the frequency of the data writing gate signal.

4. The display apparatus of claim 1, wherein a frequency of the data initialization gate signal is less than the frequency of the data writing gate signal, and wherein a frequency of the compensation gate signal is less than the frequency of the data writing gate signal.

5. The display apparatus of claim 1, wherein a frequency of the compensation gate signal is less than the frequency of the data writing gate signal.

6. The display apparatus of claim 5, wherein a frequency of the data initialization gate signal is substantially the same as the frequency of the data writing gate signal.

7. The display apparatus of claim 5, wherein a frequency of the emission signal is greater than the frequency of the data writing gate signal, and wherein a frequency of the data initialization gate signal is substantially the same as the frequency of the emission signal.

8. The display apparatus of claim 1, wherein a frequency of the data initialization gate signal is less than the frequency of the data writing gate signal, and wherein a frequency of the compensation gate signal is substantially the same as the frequency of the data writing gate signal.

9. The display apparatus of claim 1, wherein the pixel comprises:

a light emitting element;

a first transistor configured to apply a driving current to the light emitting element; and a second transistor configured to write the data voltage to a storage capacitor, and wherein the data writing gate signal is applied to a control electrode of the second transistor.

10. The display apparatus of claim 9, wherein the pixel further comprises a third transistor connected between a control electrode of the first transistor and a second electrode of the first transistor, and wherein the compensation gate signal is applied to a control electrode of the third transistor.

11. The display apparatus of claim 10, wherein the pixel further comprises a fifth transistor configured to apply a reference voltage to a second electrode of the second transistor, and wherein the compensation gate signal is applied to a control electrode of the fifth transistor.

12. The display apparatus of claim 9, wherein the pixel further comprises a fourth transistor configured to apply an initialization voltage to a control electrode of the first transistor, and wherein the data initialization gate signal is applied to a control electrode of the fourth transistor.

13. The display apparatus of claim 1, wherein the pixel comprises:

a first transistor including a control electrode connected to a first node, a first electrode connected to a second node and a second electrode connected to a third node;

a second transistor including a control electrode configured to receive the data writing gate signal, a first electrode configured to receive the data voltage and a second electrode connected to a fourth node;

a third transistor including a control electrode configured to receive the compensation gate signal, a first electrode connected to the first node and a second electrode connected to the third node;

a fourth transistor including a control electrode configured to receive the data initialization gate signal, a first electrode configured to receive an initialization voltage and a second electrode connected to the first node;

a fifth transistor including a control electrode configured to receive the compensation gate signal, a first electrode configured to receive a reference voltage and a second electrode connected to the fourth node;

a sixth transistor including a control electrode configured to receive a second emission signal, a first electrode connected to the third node and a second electrode connected to an anode electrode of a light emitting element;

a seventh transistor including a control electrode configured to receive a light emitting element initialization gate signal, a first electrode configured to receive the initialization voltage and a second electrode connected to the anode electrode of the light emitting element;

an eighth transistor including a control electrode configured to receive the light emitting element initialization gate signal, a first electrode configured to receive a bias voltage and a second electrode connected to the second node;

a ninth transistor including a control electrode configured to receive a first emission signal, a first electrode configured to receive a high power voltage and a second electrode connected to the second node;

a hold capacitor including a first electrode configured to receive the high power voltage and a second electrode connected to the fourth node;

a storage capacitor including a first electrode connected to the fourth node and a second electrode connected to the first node; and the light emitting element including the anode electrode and a cathode electrode configured to receive a low power voltage.

14. The display apparatus of claim 13, wherein the data initialization gate signal has an active pulse in a data initialization period, wherein the compensation gate signal has an inactive pulse in the data initialization period, wherein the data writing gate signal has an inactive level in the data initialization period, wherein the data initialization gate signal has an inactive level in a compensation period, wherein the compensation gate signal has an active pulse in the compensation period, wherein the data writing gate signal has the inactive level in the compensation period, wherein the data initialization gate signal has the inactive level in a data writing period, wherein the compensation gate signal has the inactive level in the data writing period, and wherein the data writing gate signal has an active pulse in the data writing period.

15. The display apparatus of claim 14, wherein the data initialization period and the compensation period are repeated multiple times prior to the data writing period.

16. The display apparatus of claim 1, wherein the pixel comprises:

a first transistor including a control electrode connected to a first node, a first electrode connected to a second node and a second electrode connected to a third node;

a second transistor including a control electrode configured to receive the data writing gate signal, a first electrode configured to receive the data voltage and a second electrode connected to a fourth node;

a third transistor including a control electrode configured to receive the compensation gate signal, a first electrode connected to the first node and a second electrode connected to the third node;

a fourth transistor including a control electrode configured to receive the data initialization gate signal, a first electrode configured to receive a first initialization voltage and a second electrode connected to the first node;

a fifth transistor including a control electrode configured to receive the compensation gate signal, a first electrode configured to receive a reference voltage and a second electrode connected to the fourth node;

a sixth transistor including a control electrode configured to receive a second emission signal, a first electrode connected to the third node and a second electrode connected to an anode electrode of a light emitting element;

a seventh transistor including a control electrode configured to receive a light emitting element initialization gate signal, a first electrode configured to receive a second initialization voltage and a second electrode connected to the anode electrode of the light emitting element;

an eighth transistor including a control electrode configured to receive the light emitting element initialization gate signal, a first electrode configured to receive a bias voltage and a second electrode connected to the second node;

a ninth transistor including a control electrode configured to receive a first emission signal, a first electrode configured to receive a high power voltage and a second electrode connected to the second node;

a hold capacitor including a first electrode configured to receive the high power voltage and a second electrode connected to the fourth node;

a storage capacitor including a first electrode connected to the fourth node and a second electrode connected to the first node; and the light emitting element including the anode electrode and a cathode electrode configured to receive a low power voltage.

17. A display apparatus comprising:

a display panel comprising a pixel;

a gate driver configured to provide a gate signal to the pixel;

a data driver configured to provide a data voltage to the pixel; and an emission driver configured to provide an emission signal to the pixel, wherein the pixel is configured to emit a light based on a data writing gate signal, a data initialization gate signal, a compensation gate signal, the emission signal and the data voltage, wherein the data initialization gate signal has an active pulse in a first period, wherein the compensation gate signal has an active pulse in the first period, wherein the data writing gate signal has an active pulse in the first period, wherein the emission signal has an active period in the first period, wherein the data initialization gate signal does not have the active pulse in a second period subsequent to the first period, wherein the compensation gate signal does not have the active pulse in the second period, wherein the data writing gate signal does not have the active pulse in the second period, wherein the emission signal has the active period in the second period, wherein at least one of the data initialization gate signal and the compensation gate signal does not have the active pulse in a third period subsequent to the second period, wherein the data writing gate signal has the active pulse in the third period, and wherein the emission signal has the active period in the third period.

18. The display apparatus of claim 17, wherein the data initialization gate signal does not have the active pulse in the third period, and wherein the compensation gate signal does not have the active pulse in the third period.

19. The display apparatus of claim 17, wherein the data initialization gate signal has the active pulse in the third period, and wherein the compensation gate signal does not have the active pulse in the third period.

20. The display apparatus of claim 17, wherein the data initialization gate signal does not have the active pulse in the third period, and wherein the compensation gate signal has the active pulse in the third period.

* * * * *